United States Patent [19]

Craun et al.

[11] Patent Number: 5,260,356
[45] Date of Patent: Nov. 9, 1993

[54] TRANSESTERIFICATION CURE OF THERMOSETTING LATEX COATINGS

[75] Inventors: Gary P. Craun, Berea; Kimberley D. Scott, Warrensville Heights, both of Ohio

[73] Assignee: The Glidden Company, Cleveland, Ohio

[21] Appl. No.: 841,012

[22] Filed: Feb. 25, 1992

Related U.S. Application Data

[63] Continuation of Ser. No. 610,971, Nov. 7, 1990, abandoned.

[51] Int. Cl.$^5$ .............................................. C08L 63/02
[52] U.S. Cl. .................... 523/414; 524/523; 524/558
[58] Field of Search ............... 523/414; 524/523, 558

[56] References Cited

U.S. PATENT DOCUMENTS

| 4,401,774 | 8/1983 | Kooymans et al. | 524/109 |
| 4,427,805 | 1/1984 | Kooymans et al. | 524/558 |
| 4,906,693 | 3/1990 | Craun et al. | 525/176 |

Primary Examiner—Joseph L. Schofer
Assistant Examiner—Jeffrey T. Smith
Attorney, Agent, or Firm—Thomas M. Schmitz

[57] ABSTRACT

Ambient and heat cured thermosetting emulsion protective coatings are produced by copolymerizing ethylenic monomers including beta-hydroxyl monomers and carboxyl ester monomers to provide a catalyst activated transesterification cure between the hydroxyl groups and the carboxyl ester groups. The transesterification catalyst comprise oxirane functionality in combination with certain classes of nucleophilic compounds. The oxirane functionality can be a catalytic epoxy compound or copolymerized glycidyl monomer or both.

19 Claims, No Drawings

TRANSESTERIFICATION CURE OF THERMOSETTING LATEX COATINGS

This is a continuation of copending application Ser. No. 610,971, filed Nov. 7, 1990, now abandoned.

This invention pertains to ambient room temperature and heat activated thermosetting emulsion paint coatings and particularly latex coatings based on a transesterification cure mechanism activated by certain transesterification catalysts to activate an ester functional material to crosslink with an hydroxyl functional material to produce an improved paint film.

BACKGROUND OF THE INVENTION

Transesterification of a simple ester compound with a simple alcohol compound is known to occur under basic conditions. The transesterification reaction is an equilibrium reaction which can be driven to completion by removing the alcohol moiety evolving from the cleaved ester. If the cleaved alcohol moiety is a low molecular weight lower alkyl alcohol such as methanol or ethanol, removal by evaporation is quite easy. It has been found that transesterification as a curing mechanism for crosslinking polymers used in paint coatings provides an attractive cure mechanism for producing thermosetting protective coatings since cleaved lower alkyl alcohols can be easily removed from the coating by simple air dry evaporation thereby driving the transesterification reaction to completion. Protective surface coatings commonly known as paint coatings are organic compositions applied to substrates to form continuous films which are cured or otherwise hardened to provide protection as well as a decorative appearance to the substrate. Protective surface coatings ordinarily comprise an organic polymeric binder, pigments, inert fillers and other additives. The polymeric binder functions as a fluid vehicle for the pigments, inerts, and other additives in wet coating compositions and further functions as a binder for the pigments and inert fillers in the cured or hardened paint film. Conventional thermosetting polymers often require high temperatures as well as external crosslinkers. Some crosslinkers, such as melamines in conventional industrial coatings or triglycidyl isocyanate for powder coatings, can cause toxicity problems. Ambient cure technologies such as isocyanates cause toxicity problems. Also, the release of volatile by-products, such as caprolactam, from some of these materials can cause film defects, such as cratering and bubbling.

Several related patents and pending patent applications pertaining to non-aqueous coatings based on hydroxyl functional polymers adapted to cure by transesterification with a carboxylic ester functional polymer in the presence of transesterification catalysts are as follows: U.S. Pat. No. 4,749,728 where the catalyst comprises an onium salt or Lewis base in combination with a catalytic epoxy compound; U.S. Pat. No. 4,906,693 where the catalyst comprises certain inorganic salts in combination with a catalytic epoxy compound; U.S. Pat. No. 4,897,450 based on transesterification of a beta hydroxyl ester addition polymer with a hydroxyl functional polymer; U.S. Ser. No. 138,149 filed Dec. 28, 1987 where the catalyst comprises a conjugate base of a weak acid having a pKa between 2.5 and 1.4 in combination with a catalytic epoxy compound; and U.S. Ser. No. 251,762 filed Oct. 3, 1988 based on certain polyester polymers.

With respect to prior art, several patents disclose the use of acids, bases, metal salts, and organic metal complexes as catalysts for transesterfying polymers such as U.S. Pat. Nos. 4,362,847; 4,376,848; 4,332,711; and 4,459,393 wherein octoates or naphthenates or lead, zinc, calcium, barium, and iron are disclosed as transesterification catalysts. Other prior art patents are as follows.

Green U.S. Pat. No. 4,559,180 discloses an organic syntheses process for simple transesterification of very low molecular weight simple carboxyl ester compounds with similar simple alcohols by reacting the same in the presence of an epoxide and a Lewis base (containing a Group V element) or a cyclic amidine. The Green patent does not pertain to coatings or polymers but merely discloses simple chemical reactions between very low molecular weight chemical compounds.

Dante and Parry have shown that phosphonium halides, such as ethyltriphenyl phosphonium iodide, are efficient catalysts for (a) 1,2-epoxide reactions with phenols to yield hydroxyl ethers (U.S. Pat. No. 3,477,990), and (b) polyepoxide reactions with carboxylic acids or acid anhydrides (U.S. Pat. No. 3,547,885). The patents suggest that polyepoxides and phenols can be reacted to form phenolic hydroxyl ethers with phosphonium salts as catalysts. The counterion of the phosphonium moiety is the anion portion of a carboxylic acid, or acid ester, such as in ethytriphenyl phosphonium acetate (U.S. Pat. No. 3,948,855).

Barnhoorn et al (U.S. Pat. No. 4,459,393) teach self-crosslinking thermosetting resin compositions obtained from the reaction of a beta-hydroxyalkyl ester of an alpha, beta-carboxylic acid with a primary mono- or polyamine to give a product have 1 to 2 amino hydrogens and further reacted with a polyglycidyl ether of a polyhydric phenol so that the final resin adduct has more than one beta-hydroxyalkyl ester group and amine groups having 1 to 2 amine hydrogen atoms per molecule. Transesterification catalysts known in the art are taught.

Subramanyam et al (U.S. Pat. No. 4,376,848) teach the preparation of water dilutable electrocoating compositions having tertiary amino-containing basic binders by reacting a secondary amino group compound with an olefinically double-bonded epoxy and the copolymerization of this product with at least one ethylenically bonded polymerizable monomer wherein said binders can self-cure and be cured in combination with amine resins and/or phenolic resins. Common transesterification catalysts are taught.

Velko patents disclose resinous compositions curable through a transesterification curing mechanism based on conventional heavy metal catalysts. For instance, U.S. Pat. No. 4,423,167 discloses a polymeric polyol adapted to be crosslinked with a polyester having at least two beta-alkoxyester groups in the presence of conventional transesterification catalysts. Similarly, U.S. Pat. No. 4,489,182 is based on a crosslinking agent having at least two delta-hydroxy ester groups, while U.S. Pat. No. 4,423,169 is based on a crosslinking agent having at least two beta- and/or gamma-ester groups, and U.S. Pat. No. 4,423,168 is based on a crosslinking agent having at least two beta-amide ester groups. The Velko patents utilize as catalysts organic salts of conventional heavy metal catalysts such as lead, zinc, iron, tin and manganese.

It now has been found that emulsion polymers produced by emulsion copolymerization of ethylenic monomers in water and contain both carboxyl ester and hydroxy polymer chains can be cured by transesterification at ambient or low bake temperatures. The coreaction emulsion polymer provides an excellent binder for paint coatings exhibiting good cure and film properties under ambient and low bake conditions. This discovery provides low toxicity (non-formaldehyde), very low VOC, good cured films exhibiting solvent resistance, hardness, flexibility, and >160 inch pounds of impact resistance (forward and reverse). Ambient and 140° F. cure can be obtained with a two pack system. One pack stable cure is obtained at 250° to 300° F. with proper choice of catalyst.

Industrial latex coatings offer significant advantages over solvent borne and most aqueous dispersed coatings, in that VOC is exceptionally low. Latex polymerization produces high molecular weight polymer, which provides better physical and chemical properties than medium and low molecular weight polymers. Crosslinking chemistries formerly available for latex use, however, are limited, and the most commonly used crosslinkers (i.e. N-methylolacrylamide) are undesirable formaldehyde based. Hence, this discovery satisfies an ongoing need for new, low bake, low toxicity crosslinking for latex systems. Room temperature cured coating films exhibited above 90% gloss (60°), more than 200 MEK rubs solvent resistance, H pencil hardness without the need for coalescent solvents, good adhesion to polycarbonates, sheet molding compounds, ABS, and similar plastic substrates, and cured films resist yellowing. The unanticipated finding in this invention was that excellent ambient cure is obtainable under certain conditions in the presence of transesterification catalysts, particularly when a blend of epoxies (bisphenol epoxies and glycidyl acrylate or methacrylate) are used as a cocatalyst with a tertiary amine.

These and other advantages of this invention will become more apparent by referring to the detailed description and the drawings.

SUMMARY OF THE INVENTION

Briefly, the invention pertains to thermosetting latex emulsion polymers for protective coatings comprising hydroxyl functional polymer chains and carboxyl ester functional polymer chains which are adapted to crosslink and cure when the coating is applied to a substrate as a paint film. The cure can be ambient or low heat initiated and is a transesterification cure activated by a transesterification catalyst comprising a catalytic amount of epoxy functional component in combination with certain nucleophilic component.

DETAILED DESCRIPTION OF THE INVENTION

The coreactive emulsion polymers of this invention comprise hydroxy functional components and coreactive carboxyl ester functional components adapted to provide a transesterification cure in the presence of certain transesterification catalysts.

Referring first to hydroxy functional polymers, useful polymers comprise addition copolymers of emulsion polymerized ethylenically unsaturated monomers including hydroxyl monomers. Ethylenically unsaturated monomers include vinyl monomers, for example, vinyl esters such as vinyl acetate, vinyl proprionate, vinyl butyrates, vinyl benzoate, isopropenyl acetate and similar vinyl esters; and vinyl halides such as vinyl chloride. Other ethylenically unsaturated monomers can include, for example, those monomeric materials exhibiting ethylenic double bond unsaturation such as polymerizable allylic, acrylic, or like ethylenically unsaturated double bond functionality. Ethylenically unsaturated monomers can include, for example, styrene, methyl styrenes, and similar alkyl styrene, chlorostyrene, vinyl toluene, vinyl naphthalene, divinyl benzene, diallyl phthalate and similar diallyl derivatives, butadiene, alkyl esters of acrylic and methacrylic acid and similar ethylenically unsaturated monomers. Further suitable ethylenically unsaturated monomers include acrylic unsaturated monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids and hydroxyl alkyl acrylates and methacrylates. Lesser amounts of carboxylic acid functional monomers can be used to reduce the inhibiting effects of acid groups on cure. Hydroxyl containing monomers are hydroxy containing ethylenically unsaturated monomers including hydroxy alkylacrylates such as 2-hydroxyl ethyl acrylate and methacrylate, 2-hydroxypropyl acrylate and methacrylate, and similar hydroxyl alkyl acrylates. On a weight basis, the hydroxyl functional addition copolymer contains copolymerized monomers comprising between 1% and 40% copolymerized hydroxyl monomer with the balance being other ethylenically unsaturated monomers, while preferred copolymers comprise 5% to 20% hydroxyl functional monomer, 30% to 90% acrylic monomer with the balance being other ethylenic monomers.

Referring next to carboxyl ester functional polymers, useful polymers comprise beta-hydroxy addition copolymers, and particularly acrylic copolymers, which provide both the ester function and hydroxyl function for the transesterification cure. Acrylic beta-hydroxy ester copolymers are produced by copolymerizing ethylenically unsaturated monomers, including a beta-hydroxy ester monomer, where peroxide or azo catalysts initiate copolymerization of the monomers double bonds. Beta-hydroxylate ester monomers include hydroxyl alkyl acrylates such as 2-hydroxy ethyl acrylate and methacrylate, 2-hydroxypropyl acrylate and methacrylate, and similar hydroxyl alkyl acrylates. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate. Other ethylenically unsaturated monomers containing carbon-to-carbon unsaturation include vinyl monomers, allylic monomers and acrylamide monomers. Vinyl esters include vinyl acetate, vinyl propionate, vinyl butyrates, vinyl benzoates, vinyl isopropyl acetates, and similar vinyl esters. Vinyl halides include vinyl chloride, vinyl fluoride, and vinylidene chloride. Vinyl aromatic hydrocarbons include styrene, methyl styrenes and similar lower alkyl styrenes, chlorostyrene, vinyl toluene, vinyl naphthalene, divinyl benzoate, and cyclohexene. Vinyl aliphatic hydrocarbon monomers include alpha olefins such as ethylene, propylene, isobutylene, and cyclohexyl as well as conjugated dienes such as butadiene, methyl-2-butadiene, 1,3-piperylene, 2,3-dimethyl butadiene, isoprene, cyclopentadiene and dicyclopentadiene. Vinyl alkyl ethers include methyl vinyl ether, isopropyl vinyl ether, n-butyl vinyl ether, and isobutyl vinyl ether. High levels of carboxyl functional monomers should be avoided. On a weight basis, the beta-hydroxy ester addition copolymer consists of copolymerized ethylenic monomers comprising between 1% and 40% beta-hydroxyl ester monomer with the balance being other ethylenically unsaturated monomer. Preferred beta-hydroxy ester copolymers are acrylic copolymers comprising copolymerized acrylic monomers with preferred beta-hydroxy ester acrylic copolymers comprising between 10% and 30% beta-hydroxy ester monomer, between 30% and 90% acrylic monomer, with the balance being other ethylenic monomer. The Tg or softening point of the emulsion polymer particles is preferably between −20° C. and 40° C. as calculated by the Fox equation based on the ratio of specific monomers or measured by ASTM 3418-75.

The polymeric binder can comprise one addition copolymer containing both hydroxyl and carboxyl ester functionality which would be self-curing, or mixtures of polymers comprising by weight between 1% and 99% hydroxyl functional polymer and between 1% and 99% carboxyl ester functional polymer having active carboxyl ester groups.

Referring next to the transesterification catalyst systems useful in accordance with this invention, the transesterification catalyst comprises certain nucleophile compounds in combination with a catalytic amount of epoxy compound.

The nucleophilic compound cocatalyst can be selected from (a) an onium salt or a Lewis base as described in commonly assigned Ser. No. 871,444 filed Jun. 6, 1986, now U.S. Pat. No. 4,749,728; (b) a conjugate base of a weak acid having a pKa between about 2.5 and 14 as described in commonly assigned Ser. No. 138,149 filed Dec. 28, 1987, or (c) an inorganic salt of a halide, an azide, a cyanide or hydroxide as described in commonly assigned U.S. Pat. No. 4,906,693, and the same are all incorporated herein by reference.

Onium salts and Lewis bases are non-acidic nucleophilic compounds substantially free of an active hydrogen. Onium salts are tetravalent compounds preferably comprising tetravalent phosphorus or phosphonium salts and tetravalent nitrogen or ammonium salts. The onium salts can be aliphatic or aromatic and various anions can be associated with the onium ions. Phosphonium salts include, tetrabutyl phosphonium acetate, tetrabutyl phosphonium chloride, ethyltriphenyl phosphonium iodide, ethyltriphenyl phosphonium acetate, and the like. Ammonium salts include benzyltrimethyl ammonium chloride, benzyltrimethyl ammonium acetate, benzyltrimethyl ammonium benzoate, tetrabutyl ammonium chloride, and the like. Fatty quats such as mono and dialkyl ammonium compounds having one or two aliphatic R groups of 8 to 16 carbons are also suitable. Examples include hexadecyltrimethyl ammonium iodide, tallow and cocoa di- and trimethyl ammonium quats, and the like. It has been found that alkyltrimethyl quats like dodecyl trimethyl ammonium acetate are more thermally stable than benzyl quats like benzyl trimethyl ammonium acetate.

Onium salts further include quaternary ammonium compounds such as tetraethyl ammonium chloride, tetrapropyl ammonium acetate, and hexyl trimethyl ammonium bromide; quaternary phosphonium compounds; onium halides and pseudo halides; onium carboxylates; and an N-alkylated pyridinium salt such as hexadecyl pyridinium bromide, chloride and acetate. Other onium catalyst compounds include tetrabutyl phosphonium bromide and chloride, tetraphenyl phosphonium iodide, and ethyl triphenyl phosphonium acetate, and can further include sulfonium salts.

Lewis bases are trivalent organic compounds containing an element selected from nitrogen, phosphorous, arsenic, antimony, or bismuth where the most useful and preferred are trivalent nitrogen or trivalent phosphorus compounds. Trivalent nitrogen compounds comprise aliphatic or aromatic amines. Tertiary amines are preferred and include, for example, dimethylbenzyl amine, diethyldecyl amine, tributyl amine, triethyl amine, trimethyl amine, triethylene diamine (DABCO), N-methyl morpholine, N,N'-dimethyl piperazine, N,N,N'N'-tetramethyl propane diamine, benzyldimethyl amine, dodecyldimethyl amine, and the like. A preferred tertiary amine is triethylene diamine. Primary and secondary amines are less desired due to active hydrogens but nevertheless can be converted to tertiary amines with excess epoxy cocatalyst prior to the esterification reaction. Amine functional polymers contain a tertiary amine group. Polymeric amine species of this type are not volatile, and hence, promote better cure. Amine functional acrylic monomers such as dimethylaminoethyl methacrylate, can be copolymerized with various monomers to form amine functional acrylic resins. Heterocyclic compounds containing trivalent nitrogens, such as pyridines, amidines, guanidine, and the like are useful. Tertiary phosphorus compounds are analogous to amines mentioned above. Examples of suitable compounds include: triphenyl phosphine, tricyclohexyl phosphine, tributyl phosphine, phenyldimethyl phosphine, diethyl benzyl phosphine and the like.

Referring next to the conjugate bases of a weak acid used in conjunction with catalytic epoxy resin to form the transesterification catalyst in accordance with this invention, suitable conjugate bases comprise various salts of the weak acids and such salts include sodium, potassium, calcium, lithium, and similar other metal salts. Suitable weak acids include weak organic and inorganic acids having a pKa between 2.5 and 14 and preferably between 2.5 and 10, where pKa is a measure of the strength of these weak acids which are often referred to as Bronsted acids. In contrast, strong acids such as hydrochloric, nitric, and sulfuric acids, and similar strong acids, have a pKa less than 2.5 whereby the conjugated based of these stronger acids do not provide suitable cocatalysts in accordance with this invention. In this regard, the strong acids dissociate easily in water to generate base anions and hydrogen ions (H+) and hence are unsuitable as cocatalysts.

Conjugate bases of weak acids, such as acetic acid, benzoic acid, and boric acid, comprise the acetate, benzoate, and borate ions. Conjugate bases of weak acids can be prepared by neutralizing the acids, such as benzoic acids, with a strong mineral base, such as KOH, to form the salt, potassium benzoate. Conjugate bases of weak organic acids include sodium benzoate, potassium acetate, potassium laurate, and sodium and potassium salts of polymeric materials. Examples of carboxylic polymeric materials include acrylics which contain salts of methacrylic acid, acrylic acid, maleic anhydride and the like (salts of these acid can be prepared with bases like KOH or NaOH before or after polymerization), and polyesters which have unreacted carboxylic acid, such as polyesters prepared from isophthalic acid, adipic acid, azeleic acid, and the like with the common diols and polyols. Conjugate bases of weak inorganic acids include substances like potassium and sodium borate, and $K_2HPO_4$. In the case of polyfunctional acids like $H_3PO_4$, the acids have to be neutralized to the conjugate bases of the appropriate strength. $KH_2PO_4$ is not a suitable cocatalyst, for instance. Conjugate bases of weak acids can be produced by reacting a weak organic acid with a base to form the conjugate base (and water). Acetic acid, for instance, reacts directly with potassium hydroxide to form the conjugate base potassium acetate. Weak acids include acetic, benzoic, formic, lauric, and other carboxylic acids and polycarboxylic acids; phenol, chlorophenols, and nitrophenol and various other substituted phenols; and various inorganic acids, such as boric acid, dipotassium phosphate, and sodium silicate. The conjugate bases of these weak acids act as cocatalysts with epoxy compounds to provide transesterification as a cure mechanism for coatings.

Referring next to the transesterification catalysts based on an inorganic salt of a halide, an azide, a cyanide, or a hydroxide, suitable inorganic salts are derived from inorganic cations other than onium salts such as sodium, potassium, lithium, calcium and iron combined with inorganic anions selected from halogens including chlorides, bromides, and iodides, as well as azides, cyanides, and hydroxides. The inorganic salts can be combined with catalytic epoxy resin to activate a transesterification cure in accordance with this invention.

The foregoing nucleophilic catalytic compounds are combined with a catalytic amount of epoxy resin compound hereinafter described to provide the transesterification catalyst combination in accordance with this invention. The catalytic epoxy can be added to preformed latex or preferably dissolved in the ethylenic monomers prior to emulsion copolymerization of the monomers to produce emulsion polymer particles containing epoxy within the polymer particles.

Referring next to the epoxy resin used as a cocatalyst with the monovalent inorganic salts, catalytic epoxy resins can be a monomeric or polymeric epoxide selected from the group consisting of $C_{2-18}$ alkylene oxides, arylalkylene oxides, cycloaliphatic oxides, and a polymeric or oligomeric epoxide having at least one epoxide group per molecule. The epoxy compound cocatalyst can be an aliphatic, an aromatic or a glycidyl acrylic type epoxy compound. The most suitable catalytic epoxy resins comprise glycidyl ethers of bisphenol or glycidyl addition polymers. Glycidyl ethers of bisphenol include typically glycidyl ethers of polymers based on bisphenol-A (or similar bisphenols) such as bisphenol A diglycidyl ether (Epon 828, Shell), and higher molecular weight versions, linear or branched, having one, two, or more glycidyl groups per molecule. Glycidyl addition polymers comprise acrylic polymers containing copolymerized ethylenically unsaturated monomers including glycidyl acrylate or methacrylate monomers. Other epoxy resins containing monofunctional oxirane are useful including oleic acid oxide, t-butyl phenyl glycidyl ether and the like.

Examples of catalytic epoxy resins useful for the cure catalyst include $C_{2-18}$ alkylene oxides and oligomers and/or polymers having epoxide functionality including multiple epoxy functionality. Particularly suitable alkylene oxides include propylene oxide, 1,2-butylene oxide, 1,2-hexylene oxide, tert-butyl glycidyl ether, phenyl glycidyl ether, glycidyl acetate, and glycidyl benzoate. Useful multifunctional oxiranes include Bisphenol-A diglycidyl ether, diglycidyl adipate, 1,4-diglycidyl butyl ether, Novolac resins and other commercial epoxy resins. Bisphenol A diglycidyl ether is a preferred epoxide. Such epoxy resins comprise a low molecular weight resin produced by bisphenols reacted with epichlorohydrin having a molecular weight between about 400 and 4,000 as measured by GPC. Preferred epoxy resins comprise linear polymer chains of repeating units of diglycidy compounds with various bisphenols such as bisphenol A or bisphenol-5. Also useful are acrylic polymers having epoxide functionality such as acrylic copolymers derived from glycidyl methacrylate. Oxirane compounds can include isobutylene oxide (2-methyl-1, 2-propene oxide), 2-methyl-1,2-hexene oxide, 2-phenyl-1, 2-propene oxide (alpha-methyl styrene oxide), 2-phenoxy methyl-1, 2-propene oxide, and the like. Other oxiranes include 2,3-dimethyl-2-butene oxide, 2-methyl-2-butene oxide, oleic acid oxide, and 1-phenyl propene oxide.

The catalyst combination comprises on a weight basis between 0.1 and 20 of a nucleophile catalyst with 1 to 30 (preferably 1 to 20) weight parts of catalytic epoxy resin per 100 weight parts of matrix thermosetting binder comprising the ester and the coreactive hydroxyl polymer. The catalyst combination can be added to the coreactive matrix polymers at a preferred level between 2 and 40 weight parts catalyst combination per 100 weight parts coreactive matrix polymers.

In accordance with this invention, transesterification is achieved by crosslinking hydroxyl functional polymers with a simple or a beta-hydroxyl ester polymer and crosslinking the respective binder components in the presence of catalytic amounts of a nucleophilic catalyst and epoxy resin compound. In practice, the nucleophilic catalyst reacts with the catalytic epoxy compound oxirane group to form the following complex:

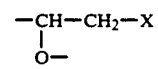

where X is the anion from an onium salt; or X is nitrogen, phosphorous, arsenic, antimony or bismuth of the Lewis bases or the like; or X is the conjugate base of a weak acid; or X is the anion of an organic salt of a halide, azide, cyanide, or hydroxide. The complex then reacts with the ester group of the beta-hydroxy ester to cleave the ester group and form a catalytic species of a low molecular weight alkoxy radical cleaved from the ester crosslinker. Then, the cleaved alkoxy radical interreacts with the hydroxyl group on the hydroxyl polymer to form an activated alkoxy polymer, and a low molecular weight alcohol. The volatile alcohol (generally ethylene or propylene glycol) can easily leave the curing polymer film. Meanwhile, the polymeric alkoxy radical from the hydroxyl polymer activates a second ester group on a beta-hydroxy ester component whereupon the activated second ester group liberates a small molecular alkoxy species and an ester bond is formed. The cleaved alkoxy radical repeats the activation between a second hydroxyl group, and a third ester group which further promotes the crosslinking between the beta-hydroxy ester crosslinker and the hydroxyl polymers while regenerating alkoxy radicals and liberating more volatile alcohol molecules.

Cure conditions vary with the concentration of relative amounts of the catalyst combination as well as the type of alcohol which leaves during the transesterification reaction. Lower boiling alcohols allow faster, lower temperature cures than higher boiling alcohols. Transesterification cures can be obtained at temperatures as low as 200° F. at 5 minutes although higher temperatures and longer cure times are required if the coating is formulated for longer shelf life beyond two weeks. Alternatively, milder curing conditions are possible if at least one of the two catalyst components is withheld from the coatings composition until soon before or during application.

Water is a very difficult medium in which to utilize epoxy and particularly to use catalytic epoxy in this invention since epoxy can hydrolyze in the presence of water to form 1,2-glycol. In accordance with a preferred aspect of this invention, the catalytic epoxy compound is dissolved in the ethylenic monomer feed and introduced into the latex system along with the monomers to be copolymerized to produce emulsion polymer particles containing epoxy within the polymer particles. In addition to avoiding hydrolysis, adding the catalytic epoxy to the monomer mixture further improved the latex polymer properties and promoted an excellent ambient transesterification cure. Hydrolysis of epoxy in water was found to increase at lower pH levels. To offset this problem, a buffer was added to the latex polymer to maintain a pH range from 4.7 to 5.6.

Epoxy functionality can be provided with glycidyl ester monomers such as glycidyl acrylate and methacrylate. When copolymerized with other monomers, the glycidyl (oxirane) functional monomer can be included at levels between 1% to 20% with 2% to 10% preferred. Thus, the epoxy catalyst component can be supplied by the glycidyl ester monomer to activate curing and particularly heat activated curing. Useful emulsion copolymers can comprise between 5% and 40% copolymerized beta-hydroxy ester monomer, between 1% and 20% copolymerized glycidyl functional monomer, with the balance being other copolymerized ethylenic monomers. The preferred emulsion copolymer comprises copolymerized ethylenic monomers between 8% and 30% beta-hydroxy ester monomer, between 30% and 90% acrylic monomer, between 2% and 10% glycidyl monomer with the balance being other monomers. Alternatively, as a supplement to the copolymerized glycidyl functional monomer, epoxy functional resin such as bisphenol A diglycidyl ether can also be used in combination with the glycidyl functional monomer. The level of epoxy will depend on the molecular weight of the epoxy, but ordinarily 1% to 30% is suitable with 5% to 15% preferred based on the weight of the polymeric binder. Both the glycidyl monomer and the epoxy resin can be simply mixed with the other monomers and fed into the reaction mixture according to this invention procedures. Mixtures of glycidyl methacrylate and Epon 828 epoxy gave an excellent ambient cure, which was not noted with higher levels of either the glycidyl (oxirane) monomer or the epoxy alone. This unexpected synergism is an important aspect of this invention, as ambient cure latices are highly desired but difficult to achieve in paint formulation.

To produce the functional emulsion polymer, the ethylenically unsaturated monomers containing epoxy catalyst dissolved therein are copolymerized in an aqueous polymerization medium by adding the ethylenic monomers to water along with surfactants and polymerizing catalysts or initiators as well as other emulsion polymerization ingredients. Initiators can include for example, typical free radical and redox types such as hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, ammonium persulfate, sodium persulfate, potassium persulfate, sodium perphosphate, potassium perphosphate, isopropyl peroxycarbonate, and redox initiators such as sodium persulfate-sodium formaldehyde sulfoxylate, ascorbic acid-ammonium persulfate, cumene hydroperoxide-sodium metabisulfite, potassium persulfate-sodium bisulfite, cumene hydroperoxide-iron (II) sulfate, etc. The polymerization initiators are usually added in amounts between about 0.1 to 2 weight percent based on the monomer additions. Suitable anionic surfactants include for example, salts of fatty acids such as sodium and potassium salts of stearic, palmetic, oleic, lauric, and tall oil acids, salts of sulfated fatty alcohols, salts of phosphated acid esters of polyethylated long chain alcohols and phenols, etc. Preferred anionic surfactants include for example, alkylbenzene sulfonate salts such as sodium dodecylbenzene sulfonate and salts of hexyl, octyl, and higher alkyl diesters of 2-sulfosuccinic acid, etc.

In addition to the hydroxyl functionality being provided with the use of any of the common hydroxyl functional hydroxyethyl and hydroxypropyl acrylates and methacrylates, it is anticipated that low molecular weight diols and polyols will also be suitable, including 1,6-hexane diol, urethane diols, polyester diols, and the like can be added to provide improved hydroxyl functional compounds.

In addition to ester functionality being provided by the hydroxyl functional monomers mentioned above, as they are beta-hydroxy esters, the hydroxyethylacrylate can function as both the hydroxyl and the ester source. It is also anticipated that other esters can be added, such as the ethylene or propylene glycol esters of diacids such as adipic acid, isophthalic acid, and dodecanedioic acid.

The balance of monomers used to make the latex can include the usual acrylate, methacrylate, styrenic, and vinyl monomers. Suitable initiators include the persulfates and other water soluble peroxides, peresters, and azo initiators. Suitable surfactant systems include the anionic sulfates such as sodium laurylsulfate, the sulfosuccinates, and the like, alone and in combination with nonionic surfactants such as the ethoxylated nonylphenols.

The following examples illustrate the merits of this invention.

EXAMPLE 1

Prepare latex 5 (Table 1) as follows:

| | GRAMS |
|---|---|
| a) deionized water | 900 |
| Monawet MM-80 (Mona) | 3.0 |
| b) butylacrylate | 3.6 |
| methylmethacrylate | 8.4 |
| c) potassium persulfate | 4.0 |
| d) NaHCO₃ | 1.8 |
| e) styrene | 60 |
| hydroxyethylacrylate | 120 |
| glycidylmethacrylate | 17 |
| Monawet MT-70 | 4.0 |
| Epon 828 (Shell) | 30 |
| butylacrylate | 237 |
| methylmethacrylate | 171 |

Place (a) in a 2 liter Morton flask under nitrogen blanket at 75° C. Stir for 45 minutes and add (b). After 15 minutes, add (c), and watch exotherm (should last about 15 minutes). Add (d), and then pump in (e) over 3 hours. Hold one hour at 75° C. and cool.

Other latexes listed in Table A were prepared by a similar procedure with glycidylmethacrylate (GMA) hydroxyethylacrylate (HEA), buffer, and Epon 828 levels as shown. All latexes had a 0° C. Fox Tg, which was obtained by adjusting the butylacrylate to methylmethacrylate ratio in (e) mix.

Methylethylketone (MEK) resistance numbers listed in Table A were obtained on Parker Bonderite 1000 steel panels at room temperature and 20 minute bakes as listed. Values are double rubs of an MEK soaked rag to the first sign of film removal. Bakes were done on the latex as is, and with 1% DABCO (Air Products tertiary diamine) added. All MEK resistance values listed were obtained 24 hours after panel preparation. Samples were retested after 7 days of cure at room temperature.

Film properties as listed in Tables B and C are very good. HB is Hamilton Beach latex stability. This high shear test is done in a Hamilton Beach milkshake mixer for up to 30 minutes Latexes pass if no coagulation occurs. Impact is ⅝ inch falling dart impact. Values are in inch pounds of impact, forward and reverse directions on the panels. To pass, films must not crack or lose adhesion. Pencil hardness and % gloss values were obtained by the standard test methods.

TABLE A

In the next set of data, the buffer is sodium bicarbonate, NaHCO3.

| LATEX NO. | GMA (%) | HEA (%) | EPON 828 | DABCO (%) | RT | MEK RESISTANCE 140 F. | 200 F. | 250 F. | 300 F. |
|---|---|---|---|---|---|---|---|---|---|
| 1 | 7 | — | — | — | 16 | 10 | 11 | 11 | — |
|   |   |   |   | 1 | 5 | 26 | 26 | 4 | — |
| 2 | — | 20 | — | — | 11 | 16 | 22 | 15 | — |
|   |   |   |   | 1 | 11 | 15 | 15 | 7 | 1 |
| 3 | — | 20 | 5 | — | 6 | 7 | 10 | 10 | — |
|   |   |   |   | 1 | 24 | 30 | 40 | 150 | — |
| 4 | 7 | 20 | — | — | 11 | 11 | 21 | 90 | — |
|   |   |   |   | 1 | 40 | 83 | 129 | 200 | — |
| 5 | 3 | 20 | 5 | — | 10 | 20 | 23 | 19 | 29 |
|   |   |   |   | 1 | 70* | 160 | >200 | >200 | >200 |
| 6 | — | 20 | 10 | — | 7 | 18 | 15 | 10 | 12 |
|   |   |   |   | 1 | 55** | 60 | 198 | >200 | >200 |

*1 week >200 (RT)
**1 week 80 (RT)

TABLE B

| Latex No. (Impact) | RT | 140 F. | 200 F. | 250 F. | 300 F. |
|---|---|---|---|---|---|
| 5 | 160/160 | 140/160 | 140/160 | 140/160 | 140/160 |
| 6 | 160/160 | 160/160 | 140/160 | 160/160 | 140/160 |
| (Gloss) | | | | | |
| 5 | 96.6 | 89.4 | 88.8 | 90.8 | 88.1 |
| 6 | 92.7 | 91.0 | 84.7 | 93.3 | 88.7 |
| (Pencil Hardness) | | | | | |
| 5 | HB | F | F | H | H |
| 6 | 2B | F | HB | F | H |

All of the above data is for the DABCO catalyzed latex.
Hamilton Beach stability >30 minutes for both 5 and 6.
Room temperature data is after one week.

We claim:

1. An aqueous thermosetting protective coating composition containing an emulsion polymeric binder adapted to cure by transesterification crosslinking, the emulsion polymer comprising on a weight solids basis:
   the polymeric binder containing polymer chains having hydroxyl functionality and polymer chains having carboxyl ester functionality and comprising emulsion polymerized ethylenically unsaturated monomers and comprising by weight between 5% and 40% beta-hydroxy ester monomer, between 1% and 20% glycidyl functional monomer containing a catalytic epoxy functionality, with the balance being other ethylenic monomers;
   where said polymeric binder contains an activating transesterification catalyst combination for activating crosslinking between the hydroxyl functional groups and the carboxylic ester functional groups, the catalyst combination comprising said catalytic epoxy functionality in said glycidyl functional monomer and between 0.1 and 10 weight parts nucleophilic compound per 100 weight parts of said binder, said nucleophilic compound selected from (a) an onium salt, (b) a Lewis base, (c) a conjugate base of a weak acid having a pka between 2.5 and 14, or (d) an inorganic salt of a halide, and azide, a cyanide or a hydroxide.

2. The coating composition of claim 1 further comprising between 1 and 20 weight parts catalytic epoxy resin compound contained within polymer particles of copolymerized monomer.

3. The coating composition of claim 1 where the nucleophilic compound comprises an onium salt.

4. The coating composition of claim 1 where the nucleophilic compound comprises a Lewis Base.

5. The coating composition of claim 1 where the nucleophilic compound comprises a conjugate base of a weak acid having a pka between 2.5 and 14.

6. The coating composition of claim 1 where the nucleophilic compound comprises an inorganic salt of a halide, an azide, a cyanide or a hydroxide.

7. An aqueous thermosetting protective coating composition containing a aqueous emulsion polymerized polymeric binder adapted to cure by transesterification crosslinking, the emulsion polymer comprising on a solids weight basis:

the aqueous emulsion polymerized polymeric binder containing polymer chains having hydroxyl functionality and polymer chains having carboxyl ester functionality, said polymeric binder consisting of emulsion polymerized polymer particles of copolymerized ethylenically unsaturated monomers containing a catalytic epoxy compound and comprising by weight between 10% and 30% beta-hydroxy ester monomer, between 30% and 90% acrylic monomer, with the balance being other ethylenic monomers;

said aqueous emulsion polymerized binder containing an activating transesterification catalyst combination for activating crosslinking between the hydroxyl functionality and the carboxyl ester functionality, the catalyst combination comprising between 1 and 30 weight parts of said catalytic epoxy compound and between 0.1 and 10 weight parts nucleophilic compound per 100 weight parts of said polymeric binder, said nucleophilic compound selected from (a) an onium salt, (b) a Lewis base, (c) a conjugate base of a weak acid having a pka between 2.5 and 14, or (d) an inorganic salt of a halide, an azide, a cyanide or a hydroxide; and where said catalytic epoxy compound is contained within said aqueous emulsion polymerized polymer particles of the aqueous emulsion polymerized polymeric binder, and where said aqueous emulsion polymerized polymeric binder is produced by dissolving said catalytic epoxy compound in said ethylenic unsaturated monomers prior to aqueous emulsion polymerization of said ethylenic monomers, and then emulsion copolymerizing said ethylenic monomers in an aqueous polymerization medium to produce the aqueous emulsion polymer particles containing catalytic epoxy compound within the copolymerized polymer particles.

8. The coating composition of claim 7 where the polymeric binder comprises a beta-hydroxy addition copolymer containing both hydroxyl functionality and carboxyl ester functionality.

9. The coating composition in claim 7 where the polymeric binder comprises between 1% and 99% hydroxyl functional polymer and between 1% and 99% carboxyl ester functional polymer.

10. The coating composition of claim 7 where the hydroxyl functional polymer comprises copolymerized monomers between 5% and 20% hydroxyl monomer, between 30% and 90% acrylic monomer with the balance being other ethylenic monomers.

11. The coating composition of claim 7 where the catalytic epoxy compound dissolved in theethylenic monomers provide polymer particles containing catalytic epoxy.

12. The coating composition of claim 7 where the copolymerized ethylenic monomers include between 0% to 20% copolymerized glycidyl functional monomer.

13. The coating composition of claim 8 where the copolymerized glycidyl monomer is between 2% and 10% by weight.

14. The coating composition of claim 8 where the coating is an ambient cure coating composition.

15. The coating composition of claim 7 where the catalyst combination comprises the epoxy compound and an onium salt.

16. The coating composition of claim 7 where the catalyst combination comprises the epoxy compound and a Lewis base.

17. The coating composition of claim 7 where the catalyst combination comprises the epoxy compound and a conjugate base of a weak acid having a pka between 2.5 and 14.

18. The coating composition of claim 7 where the catalyst combination comprises the epoxy compound and an inorganic salt of a halide, an azide, a cyanide or a hydroxide.

19. The coating composition of claim 7 where the polymeric binder comprises a beta-hydroxy addition copolymer containing both hydroxyl functionality and carboxyl ester functionality.

* * * * *